UNITED STATES PATENT OFFICE.

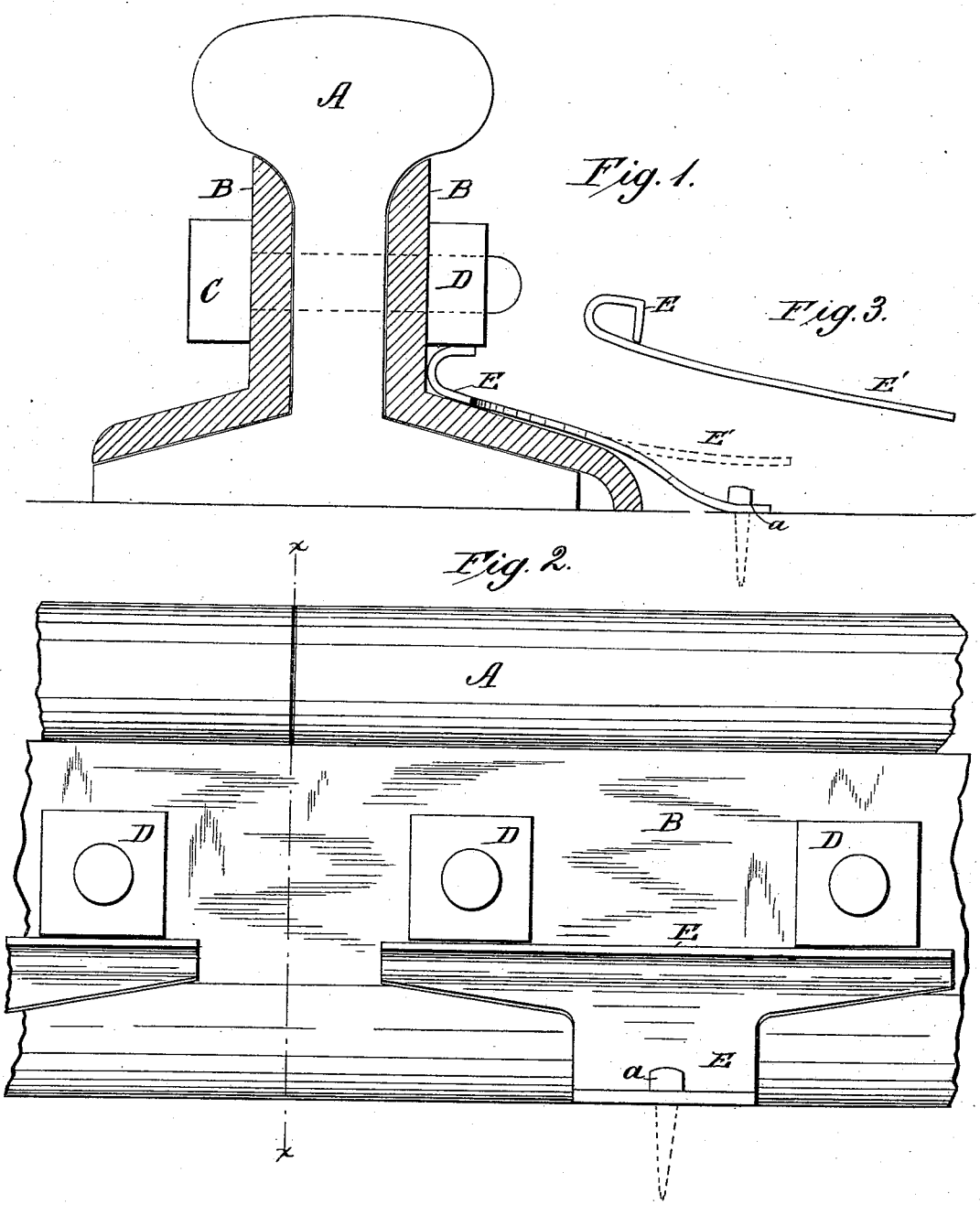

JOHN BARE, OF MOUNT UNION, PENNSYLVANIA, ASSIGNOR TO ROBERT BRUCE BARE, OF WASHINGTON, DISTRICT OF COLUMBIA.

NUT-LOCK.

SPECIFICATION forming part of Letters Patent No. 333,380, dated December 29, 1885.

Application filed August 5, 1885. Serial No. 173,640. (No model.)

*To all whom it may concern:*

Be it known that I, JOHN BARE, a citizen of the United States, residing at Mount Union, in the county of Huntingdon and State of Pennsylvania, have invented a new and useful Improvement in Nut-Locks, of which the following is a description.

Figure 1 is a cross-section through the angle-plates through line $x\ x$ of Fig. 2, showing the application of my invention. Fig. 2 is a side view of the same, and Fig. 3 shows a modification of the spring lock-bar.

The object of my invention is to provide a locking device which shall hold the nuts of the bolts used in connecting sections of railroad-rails and prevent said nuts from turning off. It is more particularly designed for holding the nuts of the bolts that secure the fish-plates or angle-bars of railroad-rails, but is applicable to other uses where it is necessary or desirable that a nut should be locked upon its bolt.

The invention consists in a T-shaped spring-bar, the cross portion of which is designed to bear beneath two nuts of the fish-plate, and the stem portion of which has a bend or set and a perforation, which bend allows the stem, when forced down and spiked to the cross-tie, to exert an elastic tension against the lower sides of the nuts that firmly holds them from turning on the screw-threaded ends of their bolts, notwithstanding the vibration and jar caused by the passing trains.

In the drawings, A represents the rail. B B are the angle-bars or fish-plates; C, the bolt, and D the nut which fastens the bolt in its position through the rail and fish-plates.

E E′ is my improved locking device, which is in the nature of a T-shaped spring-bar made of metal, and whose head or cross-piece E extends a distance far enough to rest beneath the two nuts at each end of the fish-plate and between the lower faces of said pair of nuts and the fish-plate. The stem E′ of the spring locking-bar is formed with a slight upward bend, as shown in dotted lines in Fig. 1, and has a hole in its end, through which a spike, $a$, passes into the cross-tie. When this spring-stem E′ is bent down and spiked to the cross-tie, it will be seen that an upward tension is put upon the head E of the locking-bar that causes it to bind against and press upwardly on the nuts, holding the same firmly in position and preventing them from turning. The cross-piece or top E of the T-shaped bar is preferably bent over or folded on itself, as shown in Fig. 1, so as to better fill the space between the nuts and the fish-plate, and which fold, for greater stiffness, may be extended down to contact with the bar, as shown in Fig. 3.

Having thus described my invention, what I claim as new is—

1. The combination, with the nut, fish-plate, bolt, and railroad-rail, of a T-shaped bar having a bent spring-stem, the head or cross-piece of said bar being disposed beneath the nuts and between them and the fish-plate, and its stem portion being bent down under tension and spiked to the cross-tie, substantially as described.

2. The T-shaped spring-metal locking-bar having its stem portion bent substantially as shown and described.

3. The T-shaped spring-metal locking-bar having its head or cross-piece folded on itself and its stem portion bent substantially as shown and described.

The above specification of my invention signed by me in the presence of two subscribing witnesses.

JOHN BARE.

Witnesses:
CHAS. A. PETTIT,
SOLON C. KEMON.